Figure 1:
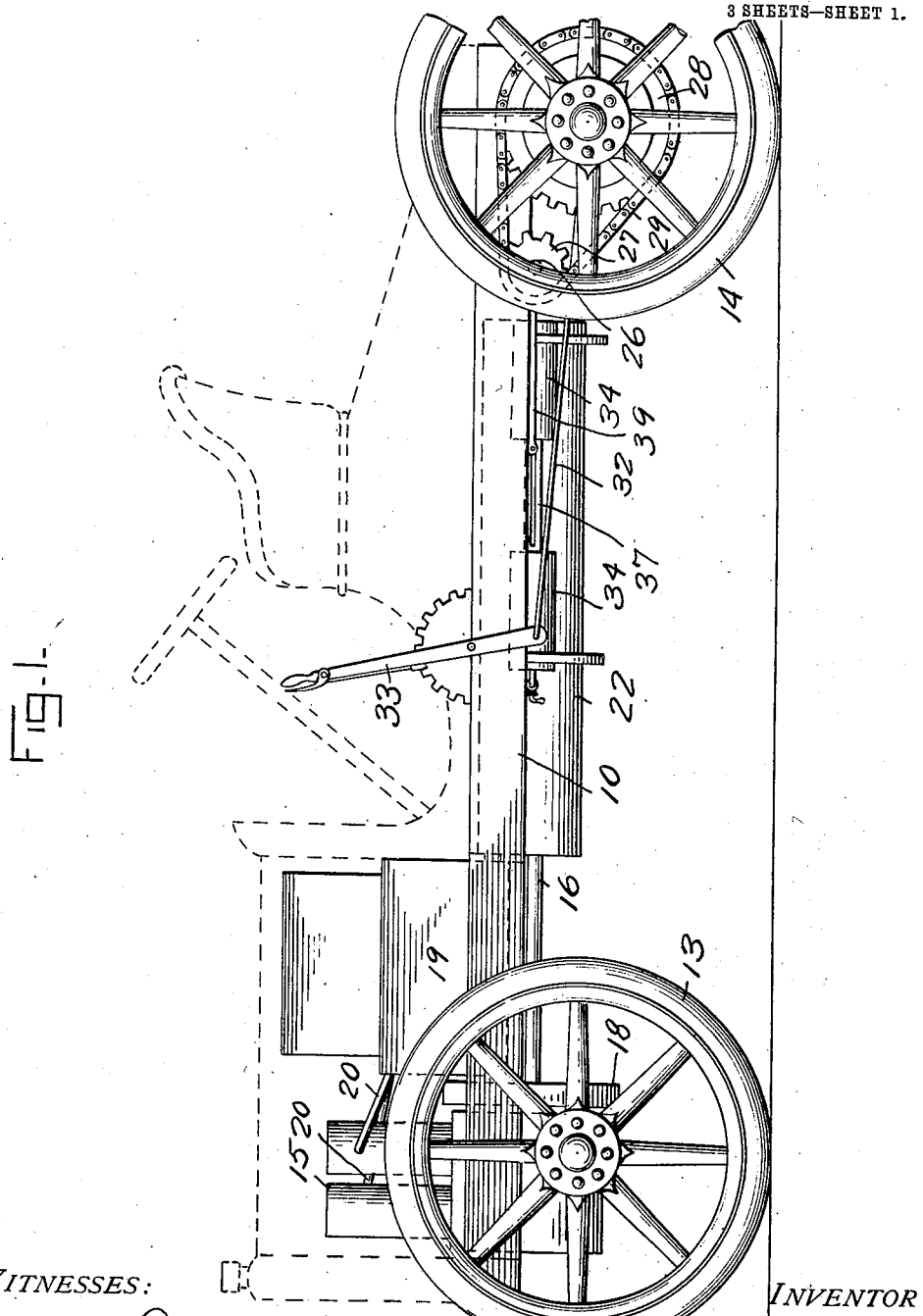

No. 865,496. PATENTED SEPT. 10, 1907.
F. G. HERRINGTON.
COMPRESSED AIR MOTOR FOR AUTOMOBILES.
APPLICATION FILED MAY 25, 1907.

3 SHEETS—SHEET 1.

WITNESSES:
G. R. Thomas
F. G. Smith

INVENTOR
Fred G. Herrington
BY
Attorneys

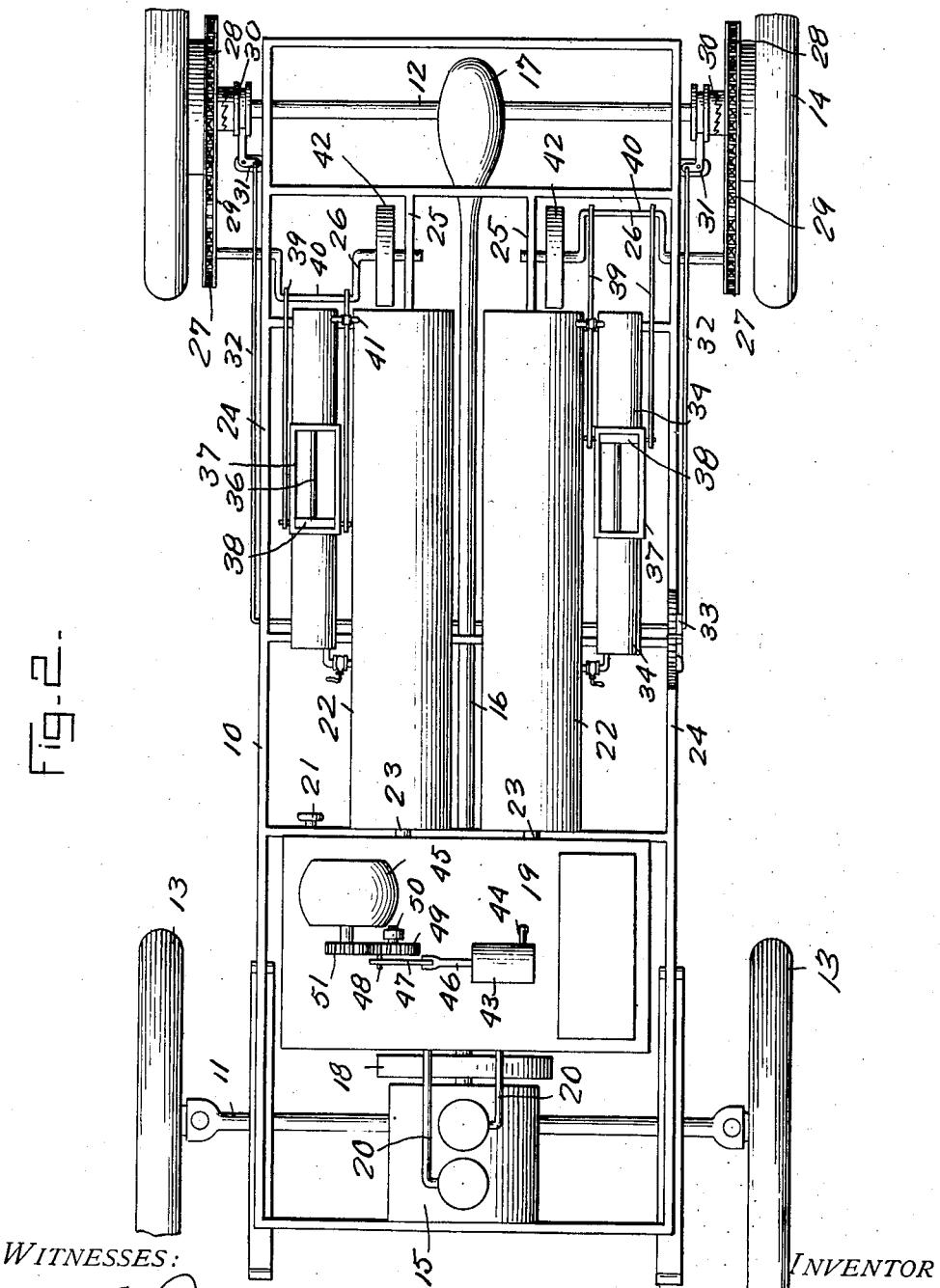

No. 865,496.
PATENTED SEPT. 10, 1907.
F. G. HERRINGTON.
COMPRESSED AIR MOTOR FOR AUTOMOBILES.
APPLICATION FILED MAY 25, 1907.
3 SHEETS—SHEET 3.
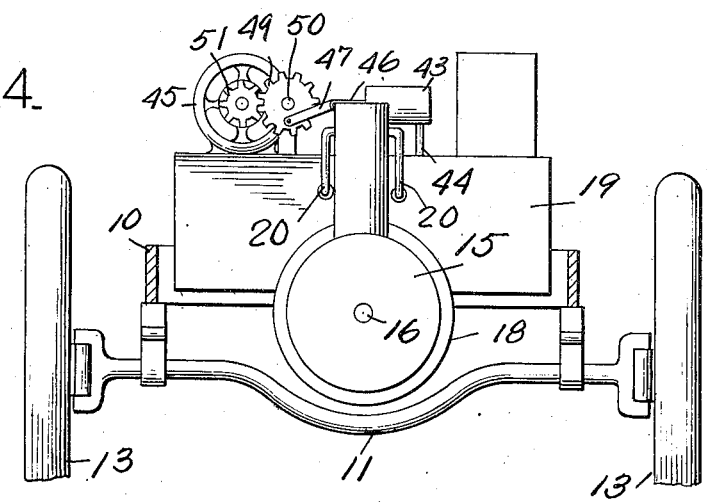
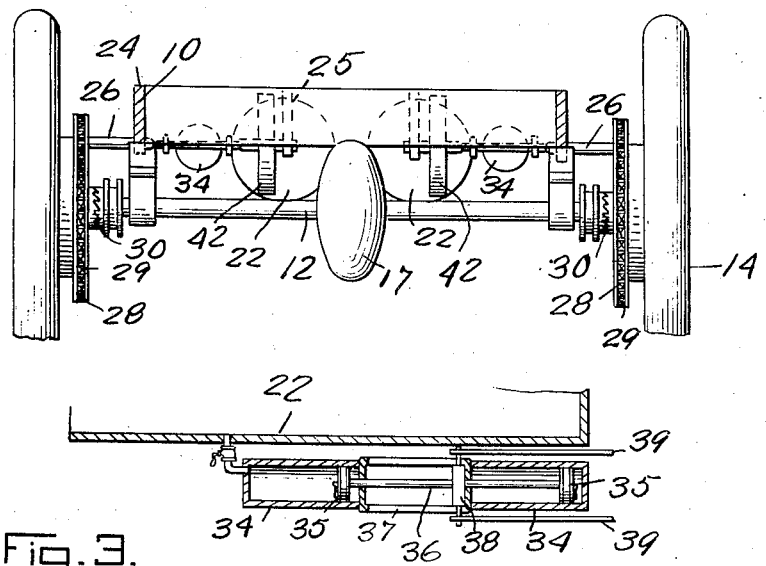
WITNESSES:
G. R. Thomas
F. G. Smith
INVENTOR
Fred G. Herrington
BY Chandler & Chandler
Attorneys

UNITED STATES PATENT OFFICE.

FRED G. HERRINGTON, OF DECATUR, ILLINOIS.

COMPRESSED-AIR MOTOR FOR AUTOMOBILES.

No. 865,496.      Specification of Letters Patent.      Patented Sept. 10, 1907.

Application filed May 25, 1907. Serial No. 375,692.

*To all whom it may concern:*

Be it known that I, FRED G. HERRINGTON, a citizen of the United States, residing at Decatur, in the county of Macon and State of Illinois, have invented certain new and useful Improvements in Compressed-Air Motors for Automobiles; and I do hereby declare the following to be a full, clear, and exact description of the invention, such as will enable others skilled in the art to which it appertains to make and use the same.

This invention relates to motors and more particularly to that class which are designed primarily for use upon automobiles.

It is a well known fact that in the present forms of automobile motors, whether they be electric, steam, or explosive, the motor is required to do constant work practically the entire time that the automobile is running. There are many disadvantages to be found in the present forms of motive power employed in this connection and while owners of automobiles have become reconciled to these disadvantages they nevertheless exist. I have found that compressed air may be used as a motive power with great efficiency upon automobiles and that in fact, by the arrangement of air compressors and other elements embodied in my invention, the machine itself may be made to supply a portion of its own motive power.

More specifically my invention contemplates the employment of air compressors which are adapted for operation from the rear axle of the machine when the same is traveling down a steep grade or under other conditions which will be apparent from the description of the invention which is to follow. It is of course entirely impractical to generate sufficient motive power by this means alone, to run the machine at all times, and I therefore provide in addition to the compressors which are operated from the rear axle, other compressors which are operated by an electric motor, the motor being used of course to generate motive power for the upgrade travel of the machine or for travel under other conditions.

It will thus be seen that while the invention does not contemplate the generation of motive power entirely by the machine itself, I have greatly reduced, by the arrangement of compressors and other elements the cost of running an automobile as far as regards the motive power therefor.

In the accompanying drawings, Figure 1 is a side elevation of an automobile employing compressed air as a motive agent and using the compressors and other elements embodied in my invention, the body of the automobile being shown in dotted lines, Fig. 2 is a top plan view of the automobile showing the relation and construction of the compressors, motors, etc., the body of the automobile being however omitted, Fig. 3 is a detail horizontal sectional view through one of the compressors operated from the rear axle of the automobile and the tank into which compressed air is forced, Fig. 4 is a front end elevation of the automobile, parts being broken away to show the invention, and, Fig. 5 is a similar view but of the rear end of the automobile.

Referring more specifically to the drawings the bed frame of the automobile is shown as being of the usual construction and is indicated in general by the numeral 10. The front axle of the automobile is indicated by the numeral 11 and the rear axle by the numeral 12, the former being provided with wheels 13 the latter with wheels 14. A compressed air motor 15 is mounted at the forward end of the machine and the power shaft of the motor which is indicated by the numeral 16 extends rearwardly and is geared with the rear axle 12, the gearing not being shown but being inclosed in the usual gear casing 17. The usual fly wheel 18 is fixedly mounted upon the shaft 16 adjacent the motor 15 and the motor is supplied with air from a storage tank 19. This tank 19 is also located at the forward end of the machine and is supported upon the frame 10 in any suitable manner. The supply pipes leading from this tank to the motor are indicated by the numeral 20 and the tank is provided with a safety valve 21.

Before describing the compressors for furnishing the tank 19 with a supply of compressed air, it will be necessary to first describe other storage tanks into which the air is first compressed and which have communication with the main storage tank 19. These other storage tanks are indicated by the numeral 22 and are positioned parallel to each other and one upon each side of the compressed-air motor shaft 16, it being understood of course that the tanks extend longitudinally to the bed frame of the automobile and are supported thereon. The forward ends of the tanks are located adjacent the rear wall of the main storage tank 19 and communication is had between the tanks 22 and the tank 19 by means of pipes 23. Journaled in side and intermediate beams 24 and 25 which form a portion of the bed frame 10 of the automobile are crank shafts 26 it being understood that there are two such shafts, one being located at each side of the machine and rearwardly of the rear ends of the tanks 22. Each of these shafts 26 carries at its outer end a fixed sprocket gear 27 upon which and a similar gear 28 carried by the corresponding wheel 14 is engaged a sprocket chain 29, there being clutches 30 for the purpose of clutching the sprockets 28 with their respective wheels 14 under conditions which will presently be described. The clutches 30 may be operated in any suitable manner and I have shown a conventional form of operating means for each sprocket gear 28 and its wheel 14 an angle lever 31 having one of its arms of yoke formation and in engagement with a grooved collar formed integral with the gear. To the other end of the angle lever is connected the rear end of a connecting rod 32 and the connecting rods for the two clutch operating devices extend forwardly and are adapted for simultaneous operation by a lever 33 at the front end of the machine.

Positioned directly outwardly of each of the tanks 22 and extending beside the same and in parallel relation thereto is a pair of air compressor cylinders 34 in each of which air compressor cylinders is arranged a piston 35, the pistons for the two cylinders being connected by a single integral piston rod 36 which in addition to working through the ends of the cylinders, works also through the ends of a cross head guide 37 which extends between the opposing ends of the cylinders 34 at each side of the machine. A cross head 38 works in each of the guides 37 and pivoted to the ends of the cross head are connecting rods 39 which are connected in a similar manner with the crank 40 of the corresponding crank shaft 26. These crank shafts are illustrated in the drawings as having their crank portions extending in opposite directions as is usually the case where coöperating crank shafts have a similar relation. Each of the air compressor cylinders 34 communicates by way of a valved pipe 41 with the adjacent tank 22 and it will be understood that when the sprockets 28 are clutched with the rear wheel 14 of the automobile, power will be transmitted to the crank shafts and to the pistons for the air compressors thereby resulting in air being compressed into the tanks 22 and subsequently into the tank 19 from which it may be admitted to the compressed air engine to operate the same. Fly wheels 42 are fixed upon the crank shafts 26.

As has heretofore been stated, it is not contemplated that the power required to compress the air is to be derived solely from the rear axle as this would be impractical and in order that air may be otherwise compressed, I have mounted at the forward end of the frame 10 an air compressor 43 which also has communication with the tank 19 by way of a tank 44 this compressor being driven from an electric motor 45. The compressor includes of course a piston 46 and connected with this piston is a pitman 47 which leads from a crank pin 48 on a cross head 49, the gear being mounted upon a shaft 50 which is counter to the shaft of the electric motor 45 and being in mesh with a pinion 51 upon the said motor shaft.

From the foregoing description of my invention it will be observed that the electric motor may first be utilized in the compression of air into the tank 19 and that the compressed air motor is operated by air supplied from this tank. When however the machine is traveling down grade, the electric motor 45 may be shut off and the sprockets 28 clutched with their respective wheels 14. The air compressors 34 will then be operated to produce the same result as the compressor 43 and as a matter of fact if the grade is steep or lengthy, sufficient air will in all likelihood be compressed to run the air compressed motor for considerable time without the necessity of bringing the electric motor 45 into use, it being understood that this not only saves frequent recharging of the batteries for the motor, but that considerable expense is spared in this and other respects.

What is claimed is—

1. A motive power for vehicles comprising a drive axle, a compressed air motor, gear connections between the power shaft of the motor and the drive axle, a main compressed air storage tank, a pipe establishing communication between the tank and the motor whereby the latter may be operated, sub-storage tanks in communication with the main storage tank, air compressors arranged to discharge into the sub-storage tanks, gearing between the said compressors and the drive axle whereby the former may be operated, a compressor arranged to discharge into the main storage tank, and a motor for operating said compressor, said motor being independent of the drive mechanism for the drive axle.

2. A motive power for vehicles comprising a drive axle, a compressed air motor, gear connections between the power shaft of the motor and the drive axle, a main compressed air storage tank, a pipe establishing communication between the tank and the motor whereby the latter may be operated, sub-storage tanks in communication with the main storage tank, air compressors arranged to discharge into the sub-storage tanks, crank shafts, connections between the crank shafts and the compressor pistons, a sprocket carried by each of the crank shafts, a sprocket loosely carried upon the drive axle adjacent each end thereof, sprocket chains connecting the sprockets at each side of the vehicle, a clutch for clutching each of the last mentioned sprocket gears with the drive axle, means whereby the said sprocket gears may be shifted upon the axle to render such clutch effective, an air compressor arranged to discharge into the main storage tank, and an electric motor for operating the compressor.

In testimony whereof, I affix my signature, in presence of two witnesses.

FRED G. HERRINGTON.

Witnesses:
J. W. CRANE,
A. JOEL BOND.